US012756247B2

(12) United States Patent
Konagawa

(10) Patent No.: US 12,756,247 B2
(45) Date of Patent: Oct. 6, 2026

(54) INSTALLATION STRUCTURE OF STATOR CORE FOR AXIAL GAP MOTOR

(71) Applicant: SUBARU CORPORATION, Tokyo (JP)

(72) Inventor: Shin Konagawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 242 days.

(21) Appl. No.: 18/636,958

(22) Filed: Apr. 16, 2024

(65) Prior Publication Data

US 2024/0413676 A1 Dec. 12, 2024

(30) Foreign Application Priority Data

Jun. 12, 2023 (JP) ................................ 2023-096512

(51) Int. Cl.

*H02K 1/18* (2006.01)
*H02K 1/14* (2006.01)
*H02K 16/00* (2006.01)

(52) U.S. Cl.

CPC ............. *H02K 1/182* (2013.01); *H02K 1/148* (2013.01); *H02K 16/00* (2013.01)

(58) Field of Classification Search

CPC ........ H02K 1/182; H02K 1/148; H02K 16/00; H02K 1/2793; H02K 1/2795; H02K 1/2798; H02K 21/026; H02K 21/24

See application file for complete search history.

(56) References Cited

U.S. PATENT DOCUMENTS

2019/0288580 A1* 9/2019 Klassen ................ H02K 21/24
2021/0091647 A1* 3/2021 Maruyama ........... H02K 1/2793
2021/0344237 A1 11/2021 Nakamura et al.

FOREIGN PATENT DOCUMENTS

WO WO 2020/059517 A1 3/2020

* cited by examiner

*Primary Examiner* — Thomas Truong

(74) *Attorney, Agent, or Firm* — McGinn IP Law Group, PLLC

(57) ABSTRACT

An installation structure of a stator core for an axial gap motor includes an annular-shaped stator core having a teeth portion split into pieces combined into an annular shape, and an annular-shaped stator plate having an outer circumference wall part and an inner circumference wall part. The stator core includes stators in a pair mounted between the outer and inner circumference wall parts of the stator plate, with a rotor provided between the stators. The stator core is formed by arc-shaped split stator teeth having outer and inner circumference surfaces provided with tapered portions with which gaps of separation respectively from the outer and inner circumference wall parts of the stator plate widen toward side of the rotor. Each of the arc-shaped split stator teeth is mounted to the stator plate, with each tapered portion engaged to an engagement member fixed to the stator plate.

3 Claims, 8 Drawing Sheets

INSTALLATION STRUCTURE OF STATOR CORE FOR AXIAL GAP MOTOR

CROSS-REFERENCE TO RELATED APPLICATIONS

The present application claims priority from Japanese Patent Application No. 2023-096512 filed on Jun. 12, 2023, the entire contents of which are hereby incorporated by reference.

BACKGROUND

The disclosure relates to an installation structure of a stator core for an axial gap motor, for example, to an installation structure of a stator core for an axial gap motor including multiple pieces.

In recent years, instead of known radial gap motors, axial gap motors that can be thinner and provide higher output have been increasingly used. The axial gap motor has a structure in which an annular stator core and a rotor that rotates about the axis of the stator core face each other on one side or both sides in the axial direction.

For the stator core of the axial gap motor, a dust core may be used instead of an electronic steel plate used in radial gap motors. The dust core involves a pressure molding step performed with a mold filled with soft magnetic powder. The use of the dust core increases a degree of freedom of shape, so that a three-dimensional magnetic circuit can be favorably configured.

FIG. 11 illustrates a stator core disclosed in WO2020/059517A1. As illustrated in FIG. 11, a stator core 30 includes stator teeth 32 split into multiple (six in this example) pieces arranged in an annular shape. A hole 38 into which a rotation shaft of a rotor is inserted is formed at the center of the stator core 30. The split stator teeth 32 are each provided with two teeth portions 34 protruding toward the rotor. The split stator teeth 32 are fix to a housing, with a fixing member such as a screw used for a through hole 36 formed in each of the split stator teeth 32.

In an axial gap motor, coils are wound around each of the teeth portions 34, and a magnetic pole is formed on the surfaces of the teeth portions 34. The magnetic pole and the polarity of a magnet disposed on the rotor makes the rotor rotatable.

SUMMARY

An aspect of the disclosure provides an installation structure of a stator core for an axial gap motor. The installation structure includes an annular-shaped stator core having a teeth portion split into pieces combined into an annular shape with a hole at a center part, and an annular-shaped stator plate having an outer circumference wall part and an inner circumference wall part at an outer circumference edge and an inner circumference edge respectively. The annular-shaped stator core includes stators in a pair mounted between the outer circumference wall part and the inner circumference wall part of the stator plate, with a rotor provided between the stators to rotate about center of the hole. The annular-shaped stator core is formed by arc-shaped split stator teeth having an outer circumference surface and an inner circumference surface provided with tapered portions with which gaps of separation respectively from the outer circumference wall part and the inner circumference wall part of the stator plate widen toward side of the rotor. Each of the arc-shaped split stator teeth is mounted to the stator plate, with each of the tapered portions engaged to an engagement member fixed to the stator plate.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the stator core 30 disclosed in WO 2020/059517A1, the split stator teeth 32 are fixed to a lid of the housing or a stator plate, with the screw provided through the through hole 36 as described above. However, the formation of the through hole 36 through the stator core 30 is unfavorable considering the impact on the magnetic circuit. Reduction of the impact of the through hole 36 leads to a problem of an increased size or complexity of the stator core 30.

The split stator teeth 32 are a dust core involving a pressure molding step performed with a mold filled with soft magnetic powder as described above. Thus, the screw fastening with a hole for screwing formed in the split stator teeth 32 leads to a problem in terms of strength and durability of the split stator teeth considering the material brittleness. There is a further problem in that the number of manufacturing assembly steps increases.

In the axial gap motor, the positional relationship between the teeth portion of the stator core and the magnet on the rotor is crucial, meaning that the precise positioning and fixing of the stator core with respect to the stator plate is important. Unfortunately, the precise positioning is difficult to achieve with the method of fixing the stator core using screws. For example, if the screw hole for fixing the split stator teeth to the stator plate using a screw is formed in a deviated position, the precise positioning becomes immediately impossible. Such a failure in precise positioning leads to a further problem in that the best performance of the axial gap motor is not attainable.

It is desirable to provide an installation structure of a stator core for an axial gap motor with which a stator core can be installed while being appropriately positioned, without adding any configuration adversely affecting a magnetic circuit to the stator core.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
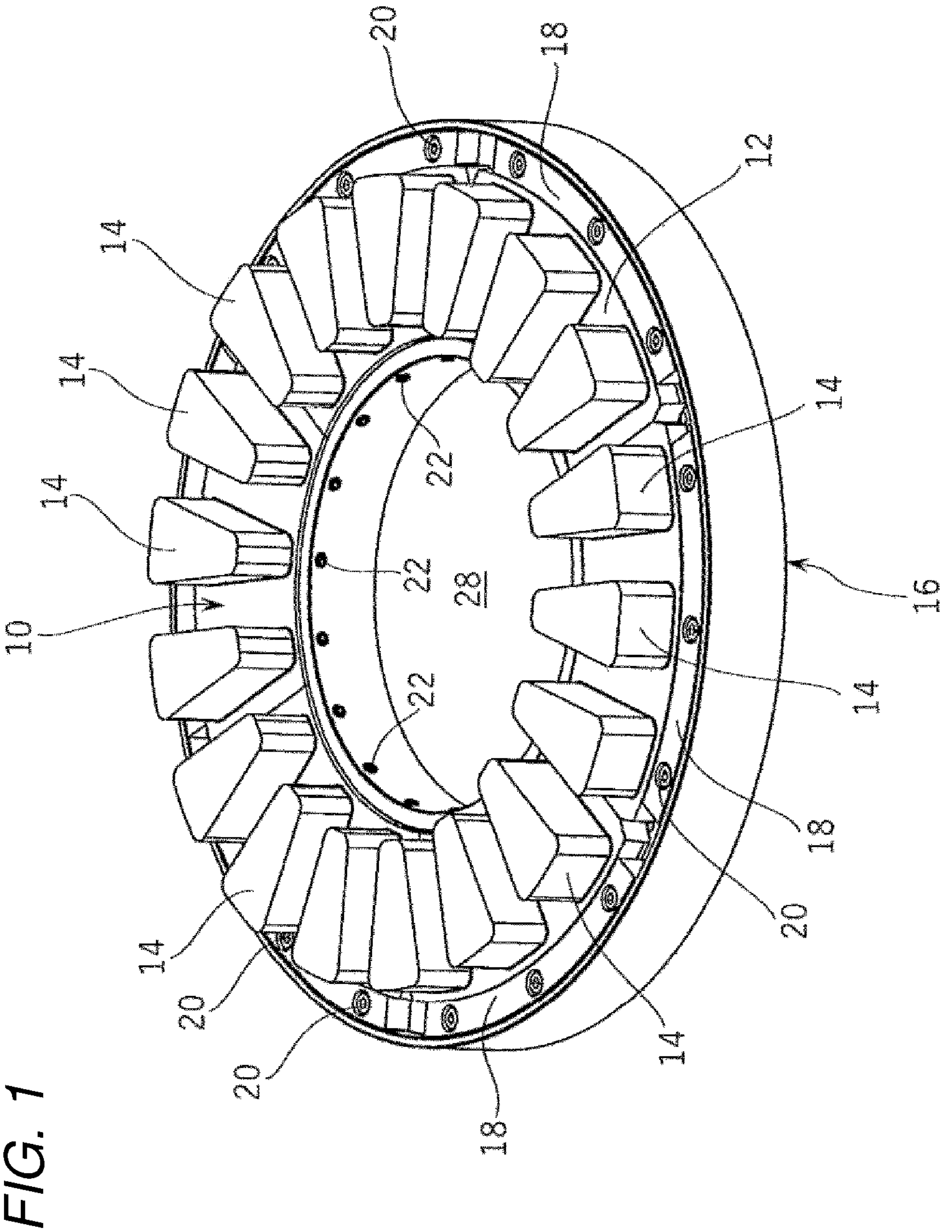
FIG. 1 is a perspective view related to an embodiment of an installation structure of a stator core for an axial gap motor of the disclosure.
Figure 2:
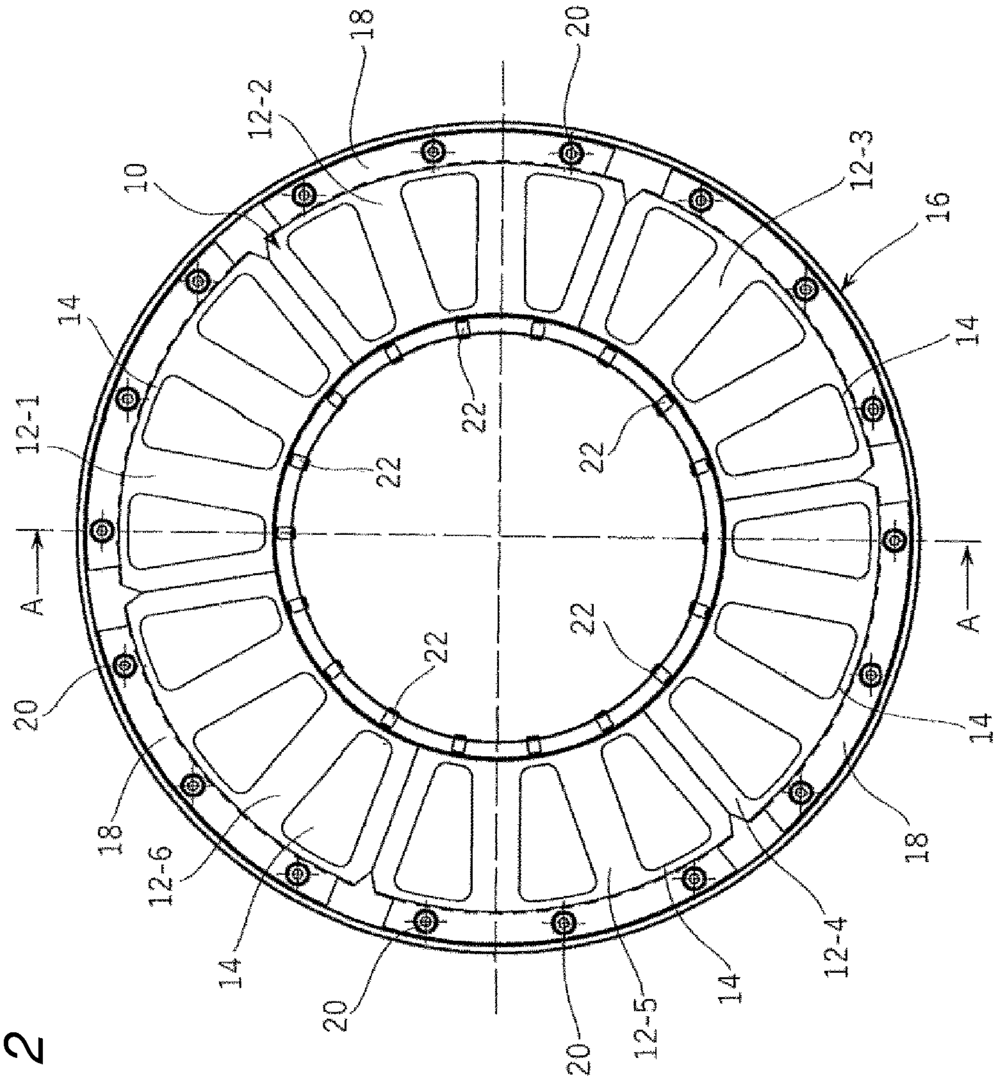
FIG. 2 is a plan view of FIG. 1.
Figure 3:
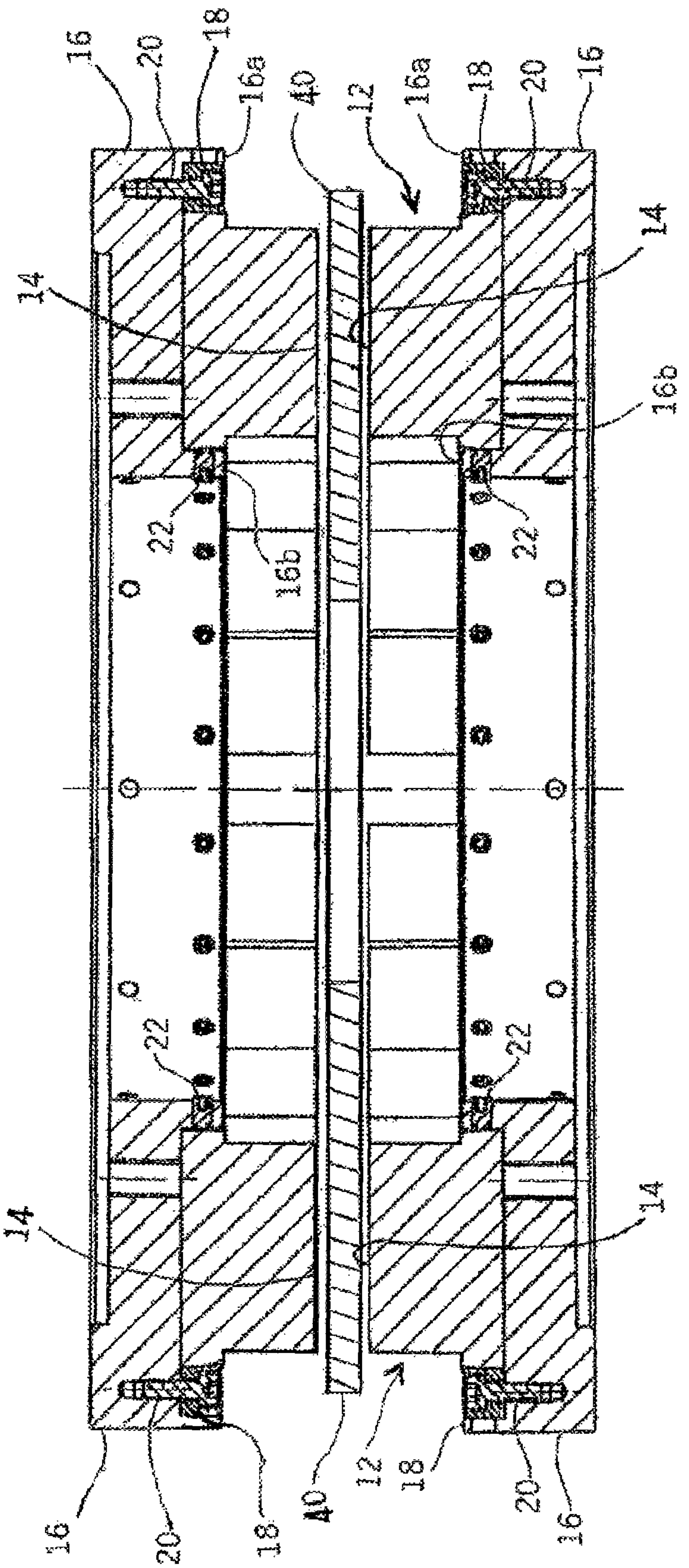
FIG. 3 is a cross-sectional view taken along A-A in FIG. 2.
Figure 4:
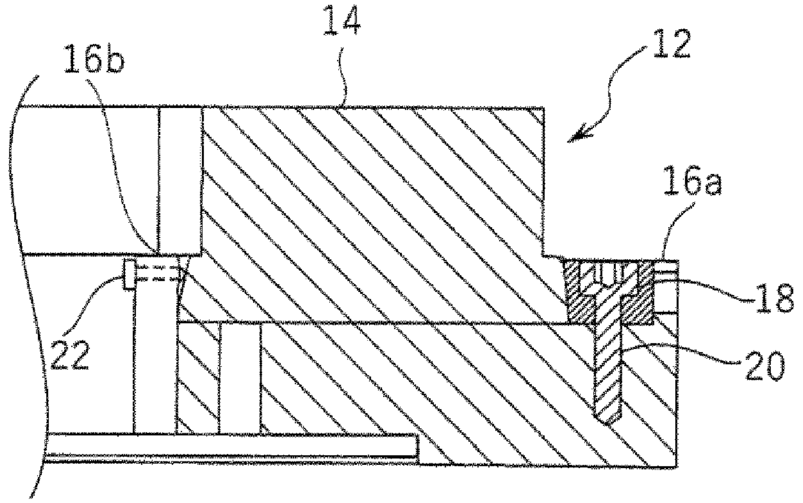
FIG. 4 is a partially enlarged cross-sectional view of FIG. 3.

FIG. 1 is a perspective view illustrating a state in which a stator core 10 for an axial gap motor according to the present embodiment is mounted on a stator plate 16, FIG. 2 is a plan view of the same, and FIG. 3 is a cross-sectional view taken along A-A of the plan view in FIG. 2. FIG. 4 is a partially enlarged cross-sectional view of the cross-sectional view in FIG. 3. The stator core 10 is formed in an annular shape with six split stator teeth 12 described below, and is attached to the stator plate 16 similarly formed in an annular shape, using a fastening member described below.

Figure 5:
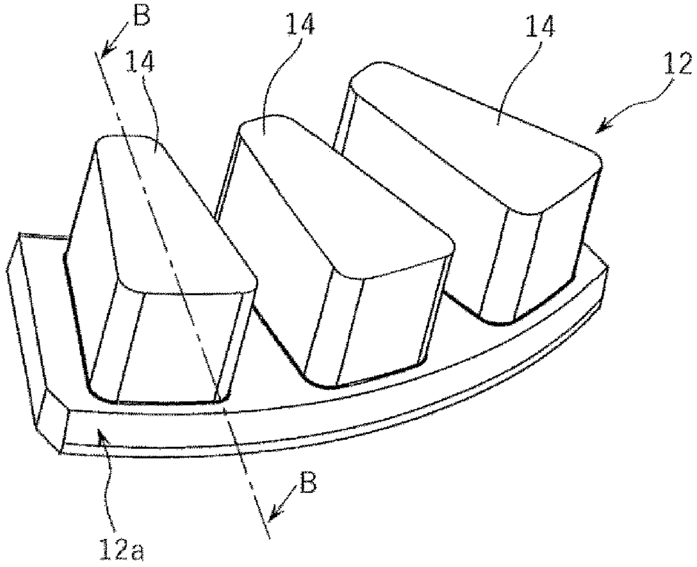
FIG. 5 is a perspective view of split stator teeth of the stator core illustrated in FIG. 1.

As illustrated in the figures, in the present embodiment, the stator core 10 having an annular shape is formed by the six split stator teeth 12. FIG. 5 illustrates one of the stator teeth 12 each having an arc shape in plan view and each having three teeth portions 14 formed on the upper surface. The split stator teeth 12 are formed by pressure molding performed with a mold filled with soft magnetic powder. In each of the teeth portions 14 around which a coil is wound, a magnetic circuit is formed when voltage is applied.

A hole 28 is formed in a center part of the stator core 10 including the split stator teeth 12 combined into an annular shape. The rotation shaft of the rotor 40 is positioned at the center of the hole 28. The rotor 40 is disposed to face the stator core 10.

Figure 6:
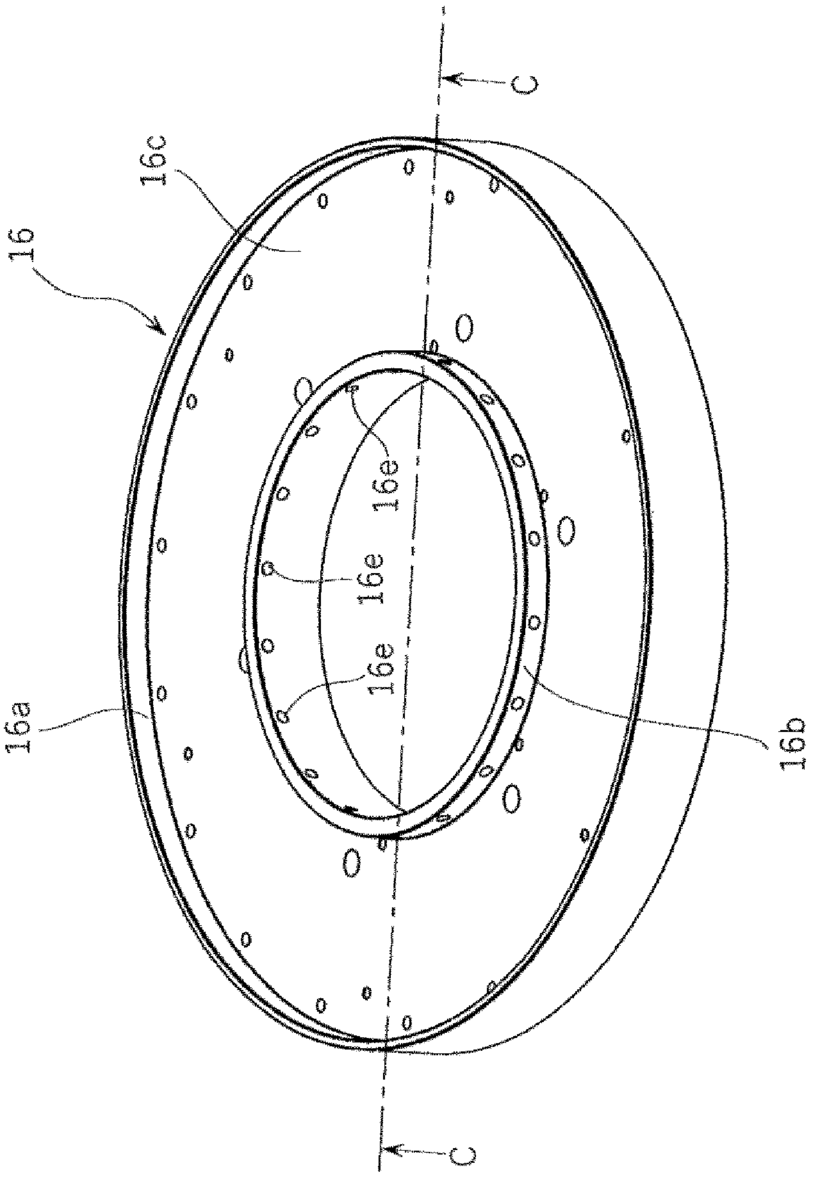
FIG. 6 is a perspective view of a stator plate illustrated in FIG. 1.
Figure 7:
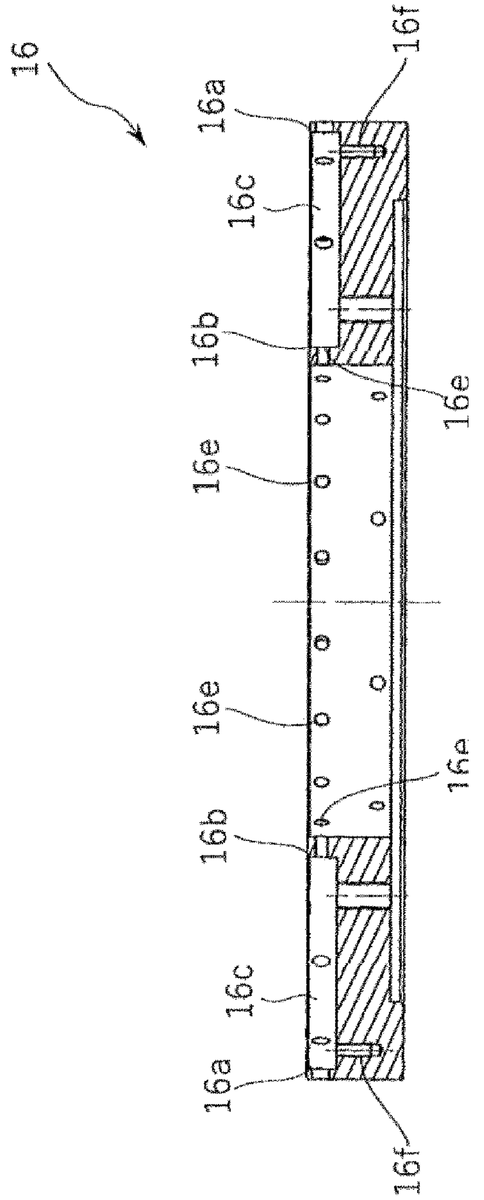
FIG. 7 is a cross-sectional view, taken along C-C, of the stator plate illustrated in FIG. 6.

FIG. 6 is a perspective view of the stator plate 16, and FIG. 7 is a cross-sectional view of the same taken along C-C. The stator core 10 is fixed on the stator plate 16. As illustrated in the figures, the stator plate 16 is formed in an annular shape, and is made of a non-magnetic material such as aluminum. An outer circumference wall part 16*a* and an inner circumference wall part 16*b* are respectively formed on an outer circumference edge and an inner circumference edge of the stator plate. A space between these wall parts is a recess part 16*c* where the split stator teeth 12 are placed.

Figure 8:
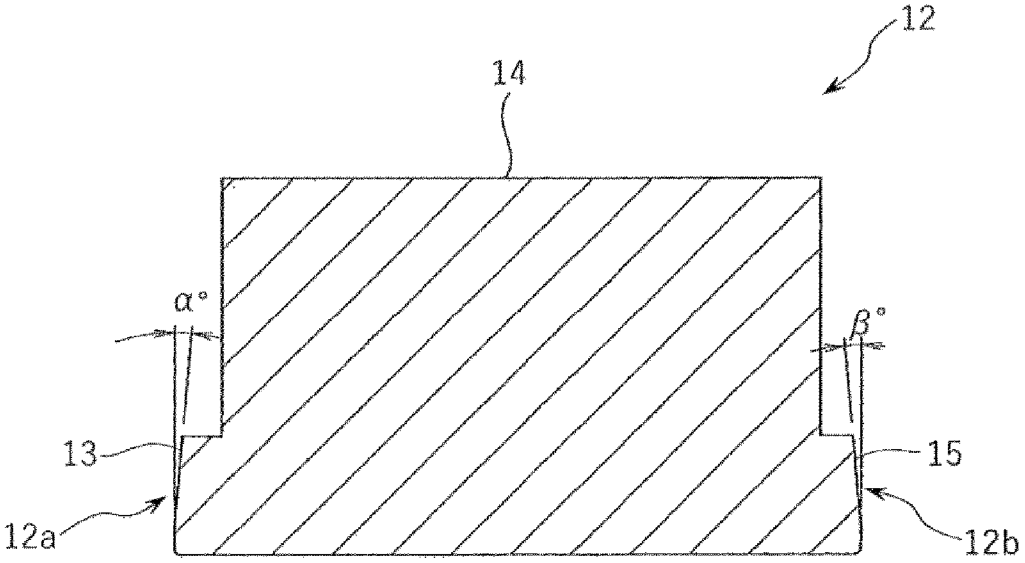
FIG. 8 is a cross-sectional view, taken along B-B, of the split stator teeth illustrated in FIG. 5.

FIG. 8 is a cross-sectional view, taken along B-B, of the split stator teeth 12 illustrated in FIG. 5. An outer circumference surface 12*a* on the outermost circumference side of one of the split stator teeth 12 is provided with a tapered portion 13. The tapered portion 13 is inclined (at an angle $\alpha°$) in such a manner that a gap of separation from the facing outer circumference wall part 16*a* of the stator plate 16 is widened toward the rotor disposed in a facing manner (inclination involving gradual widening toward the upper side in the figure). An inner circumference surface 12*b* on the innermost circumference side of the split stator teeth 12 is provided with a tapered portion 15 that is similarly inclined (at an angle $\beta°$) in such a manner that a gap of separation from the facing inner circumference wall part 16*b* of the stator plate 16 is widened toward the rotor disposed in a facing manner (inclination involving gradual widening toward the upper side in the figure).

Next, attachment of each of the split stator teeth 12 in the recess part 16*c* of the stator plate 16 using an engagement member will be described. As the engagement member, fastening screws 22 as illustrated in FIG. 1, FIG. 3, and FIG. 4 are used for the engagement on the inner circumference side. Fastening metal fittings 18, fastening bolts 20, and the fastening screws 22 as illustrated in FIG. 1, FIG. 3, and FIG. 4 are used for the engagement on the outer circumference side.

The split stator teeth 12 are mounted in the recess part 16*c* of the stator plate 16. The engagement on the inner circumference side is achieved with the distal end of the fastening screw 22 coming into contact with the tapered portion 15 of the split stator teeth 12 thus mounted. The fastening screw 22 is screwed into a fastening screw hole 16*e* formed in the inner circumference wall part 16*b* of the stator plate 16, to have the distal end brought into contact with the tapered portion 15. With the fastening screw 22 thus brought into contact with the tapered portion 15, the upward movement of the split stator teeth 12 in FIG. 4 is restricted.

Thus, by simply forming the fastening screw hole 16*e* into which the fastening screw 22 is inserted in the inner circumference wall part 16*b* of the stator plate 16, the engagement structure is obtained. With the fastening screw 22 inserted through a portion of the inner circumference wall part 16*b* facing the tapered portion 13 of the split stator teeth 12 to have the distal end brought into direct contact with the tapered portion 15, the movement of each of the split stator teeth 12 toward the rotor can be restricted, whereby a stable installed state can be achieved.

Next, engagement on the outer circumference side will be described. First of all, the fastening metal fitting 18 as an intermediate member is fit in a gap between the outer circumference surface 12*a* of each of the split stator teeth 12 and the outer circumference wall part 16*a* of the stator plate 16.

Figure 9:
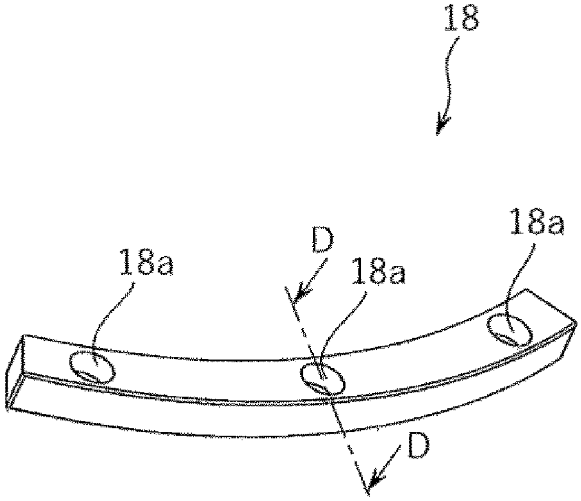
FIG. 9 is a perspective view of an arc-shaped fastening metal fitting illustrated in FIG. 1.
Figure 10:
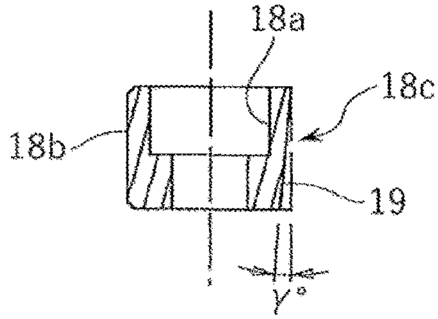
FIG. 10 is a cross-sectional view, taken along D-D, of the arc-shaped fastening metal fitting illustrated in FIG. 9.
Figure 11:
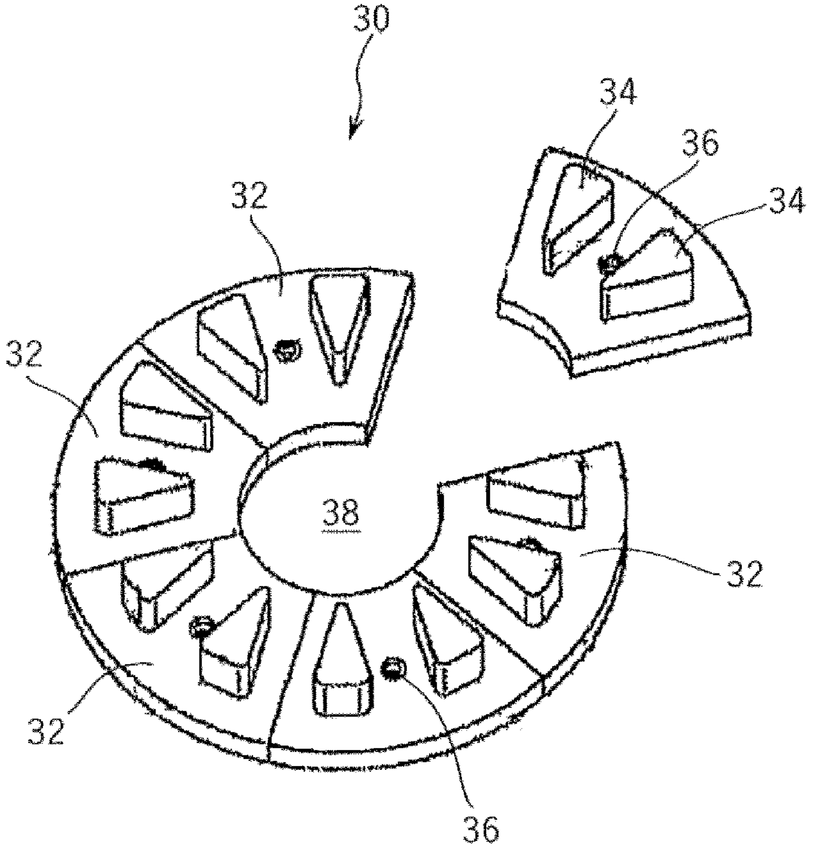
FIG. 11 is a diagram illustrating a stator core in WO 2020/059517A1.

FIG. 9 illustrates a configuration of the fastening metal fitting 18. FIG. 10 is a cross-sectional view, taken along D-D, of the arc-shaped fastening metal fitting illustrated in FIG. 9. The fastening metal fitting 18 is made of a non-magnetic material such as aluminum, and is formed to have an arc shape corresponding to the arc shape of the gap between the outer circumference wall part 16*a* of the stator plate 16 and the outer circumference surface 12*a* of the split stator teeth 12 in plan view as illustrated in the figure. Importantly, the fastening metal fitting 18 has an inner circumference surface 18*c* provided with a tapered portion 19. The tapered portion 19 is set to be inclined to be in close contact with the tapered portion 13 of the outer circumference surface 12*a* of the split stator teeth 12, when the fastening metal fitting 18 is fit in the gap between the outer circumference wall part 16*a* of the stator plate 16 and the outer circumference surface 12*a* of the split stator teeth 12. Thus, the inclination (angle $\gamma°$) of the tapered portion 19 is substantially the same as the inclination (angle $\alpha°$) of the tapered portion 15 of the outer circumference surface 12*a* of the split stator teeth 12.

With the fastening bolt 20 that is a screw member is screwed into the stator plate 16 through the fastening metal fitting 18 to be fixed, the stable contact state of the fastening metal fitting 18 to the tapered portion 13 of the split stator teeth 12 is guaranteed. Thus, the direction of screwing of the fastening bolt 20 into the stator plate 16 may be different from the direction of contact of the fastening metal fitting 18 to the tapered portion, whereby the engagement structure using the fastening bolt 20 can be applied in a wider range of variation. Also with the engagement structure using the fastening metal fitting 18, the movement of each of the split stator teeth 12 toward the rotor is appropriately restricted.

In the installation structure of the stator core 10 for an axial gap motor according to the present embodiment as described above, the outer circumference surface 12*a* and the inner circumference surface 12*b* of the split stator teeth 12 are respectively provided with the tapered portions 13 and 15, with which the gaps respectively separating from the outer circumference wall part 16*a* and the inner circumference wall part 16*b* of the stator plate 16 are widened toward the rotor. Thus, the fastening metal fitting 18 as the intermediate member fixed to the stator plate 16 by the fastening bolt 20 comes into contact with the outer circumference surface 12*a* of the split stator teeth 12, and the distal end of the fastening screw 22 also fixed to the stator plate 16 comes into contact with the inner circumference surface 12*b* of the split stator teeth 12, whereby a stable fixed state is achieved.

Thus, the through holes and the recess part are formed in the stator plate 16 for attaching the fastening member, the stator core 10 itself is free of additional structure. With this configuration, when the fastening member is directly or indirectly in contact with the tapered portions 13 and 15 of the split stator teeth 12, the movement of each of the split stator teeth 12 toward the rotor is restricted, whereby a defect caused by a compromised function due to an adverse impact on a magnetic circuit or the like can be avoided.

Furthermore, the stator core 10 can be precisely positioned and fixed to the stator plate 16, without adding any function-compromising structure to the stator core 10. Thus, the axial gap motor can have higher performance.

The disclosure is not limited to the embodiment described above, and can be changed in various ways without departing from the gist of the disclosure. For example, while an example where the number of split stator teeth 12 is six is described, a configuration with a different number of split stator teeth 12 is also applicable.

With this configuration in which each of the outer circumference surface and the inner circumference surface of each of the split stator teeth is provided with the tapered portion, the movement of the stator core is restricted when the engagement member is in contact with the tapered portions. The tapered portions are inclined in such a manner that the gaps of separation from the outer circumference wall part and the inner circumference wall part of the stator plate are widened toward the rotor, and each of the split stator teeth is engaged to the tapered portions by the engagement members fixed to the stator plate. For example, the engagement can be easily achieved by contact between the engagement member and the tapered portion or the like. The contact restricts the movement of each of the split stator teeth toward the rotor. The engagement position of the engagement member to the tapered portion may be set without high precision as long as the position is in a region including the tapered portion. Thus, the state where the engagement member is in contact with the tapered portion can be guaranteed easily.

Thus, the stator core is provided with no through holes for fixing, whereby the property of the magnetic circuit would not be compromised. Furthermore, there can be a sufficient number of engagement portions to more rigidly fix the stator core.

With an installation structure of a stator core for an axial gap motor of the disclosure, the stator core can be fixed and precisely positioned with respect to the stator plate, without adding any function-compromising structure to the stator core. The problem regarding the strength and durability of the stator core due to the use of the powder compacting can also be resolved. Thus, an axial gap motor with higher performance can be achieved.

The invention claimed is:

1. An installation structure of a stator core for an axial gap motor, the installation structure comprising:

an annular-shaped stator core comprising a teeth portion split into pieces combined into an annular shape with a hole at a center part; and an annular-shaped stator plate comprising an outer circumference wall part and an inner circumference wall part at an outer circumference edge and an inner circumference edge respectively, the annular-shaped stator core comprising stators in a pair being mounted between the outer circumference wall part and the inner circumference wall part of the stator plate, with a rotor provided between the stators to rotate about center of the hole, wherein the annular-shaped stator core is formed by arc-shaped split stator teeth comprising an outer circumference surface and an inner circumference surface provided with tapered portions with which gaps of separation respectively from the outer circumference wall part and the inner circumference wall part of the stator plate widen toward the rotor, wherein, each of the arc-shaped split stator teeth is mounted to the stator plate, with each of the tapered portions engaged to an engagement member fixed to the stator plate, and wherein an engagement structure of the arc-shaped split stator teeth using the engagement member is achieved with a fastening member that is in direct or indirect contact with the tapered portions of the arc-shaped split stator teeth, while being fastened to the stator plate.

2. The installation structure of the stator core for the axial gap motor according to claim 1, wherein the engagement structure of the arc-shaped split stator teeth using the fastening member is achieved with a screw member that is provided through the inner circumference wall part of the stator plate from outside of the inner circumference wall part to have a distal end brought into contact with the tapered portion of the arc-shaped split stator teeth.

3. The installation structure of the stator core for the axial gap motor according to claim 1, wherein the engagement structure of the arc-shaped split stator teeth using the fastening member is achieved with an intermediate member that is disposed between the outer circumference wall part of the stator plate and the tapered portion of the arc-shaped split stator teeth to be in contact with the tapered portion, and a screw member that is screwed to the stator plate through the intermediate member.

* * * * *